United States Patent
Ozaki

(10) Patent No.: US 7,457,136 B2
(45) Date of Patent: Nov. 25, 2008

(54) OVERCURRENT PROTECTIVE DEVICE FOR SWITCHING ELEMENT

(75) Inventor: Kiminori Ozaki, Kariya (JP)

(73) Assignee: Kabushiki Kaisha Toyota Jidoshokki (JP)

( * ) Notice: Subject to any disclaimer, the term of this patent is extended or adjusted under 35 U.S.C. 154(b) by 157 days.

(21) Appl. No.: 11/445,857

(22) Filed: Jun. 1, 2006

(65) Prior Publication Data
US 2006/0285372 A1    Dec. 21, 2006

(30) Foreign Application Priority Data
Jun. 2, 2005    (JP)    ............................. 2005-162199

(51) Int. Cl.
*H02M 3/335*    (2006.01)
(52) U.S. Cl. .................... 363/17; 363/56.03; 363/37
(58) Field of Classification Search ............. 363/16–20, 363/37, 41, 98, 95, 132, 127, 56.03; 323/235, 323/282–284; 361/31, 58, 93, 42, 56, 88
See application file for complete search history.

(56) References Cited
U.S. PATENT DOCUMENTS
4,947,309 A * 8/1990 Jonsson ....................... 363/17

FOREIGN PATENT DOCUMENTS
JP    05-137392    6/1993
JP    2002-354659    12/2002

* cited by examiner

*Primary Examiner*—Rajnikant B Patel
(74) *Attorney, Agent, or Firm*—Woodcock Washburn LLP

(57) ABSTRACT

An overcurrent protective device has a current detecting section and a control section. The current detecting section detects the amount of a current flowing through switching elements of an inverter device. The control section determines whether the inverter device is held in a first state or a second state in correspondence with an input from the current detecting section. When it is determined that the inverter device is held in the first state, the control section performs a flywheel operation. When it is determined that the inverter device is held in the second state, the control section performs a regenerative operation. Accordingly, the overcurrent protective device prevents generation of whine when performing overcurrent protective operation.

5 Claims, 3 Drawing Sheets

OVERCURRENT PROTECTIVE DEVICE FOR SWITCHING ELEMENT

CROSS REFERENCE TO RELATED APPLICATIONS

This application claims priority to Japanese application no. 2005-162199 filed Jun. 2, 2005.

BACKGROUND OF THE INVENTION

The present invention relates to an overcurrent protective device for switching elements, and, more particularly, to an overcurrent protective device for switching elements suitable for use in an inverter device that uses a battery of a vehicle as a power supply.

An inverter device drives household electric appliances using a battery installed in a vehicle as a power supply. Since some of such appliances may cause excessively high load acting on the inverter device, an overcurrent protective device for switching elements is provided in the inverter device. An example of the overcurrent protective device is illustrated in FIG. 6. As shown in the drawing, the overcurrent protective device includes a current detecting circuit 45 that detects a current flowing in each of switching elements 41, 42, 43, 44, which form an inverter. If an overcurrent is detected, all of the switching elements 41 to 44 are turned off, including the switching element(s) that should be maintained in an ON state if the overcurrent were not, detected.

After the switching elements 41 to 44 are turned off due to the overcurrent that has been detected by the current detecting circuit 45, the current flowing in each switching element 41 to 44 decreases. This reduces the voltage detected by the current detecting circuit 45, and the overcurrent is canceled. The switching elements that should be maintained in an ON state if the overcurrent is not detected are thus turned on. Therefore, if the excessively high load is continuously applied to the inverter, the switching elements 41 to 44 are repeatedly turned on and off in a relatively short period.

This causes the switching elements 41 to 44 to switch at high frequencies, increasing switching loss. To solve this problem, an overcurrent protective device that prevents a switching frequency from increasing when an overcurrent protective circuit is in operation has been proposed (see, for example, Japanese Laid-Open Patent Publication No. 2002-354659).

Also, an output current limiting system for a motor driving inverter has been proposed (see, for example, Japanese Laid-Open Patent Publication No. 5-137392). The system suppresses oscillation of a motor current in an overcurrent protective device that turns off all the switching elements of an inverter when an overcurrent is detected. The system also prevents occurrence of surge voltage. Specifically, as illustrated in FIG. 7, the system turns off only one of a switch Sa1 and a switch Sb2 if an overcurrent is caused when the switches Sa1, Sb2 are both held in an ON state. When the switch Sa1 is turned off, a reactive current is caused in a closed circuit that is defined by a point P, a motor resistor R, an inductance L, the switch Sb2, and a diode Da2. The reactive current is thus consumed by the motor resistor R. When the switch Sb2 is turned off, a reactive current is caused in a closed circuit that is defined by the point P, the motor resistor R, the inductance L, a diode Db1, and the switch Sa1. This causes the reactive current to be consumed by the motor resistor R.

Further, there are cases in which switching of an inverter in overcurrent protective operation is performed at a frequency higher than the upper limit of audio frequency, which is 20 kHz. For example, if the switching frequency is set to 40 kHz in the overcurrent protective device of Japanese Laid-Open Patent Publication No. 2002-354659, which prevents the switching frequency from increasing when the overcurrent detecting circuit is in operation, the inverter may cause disturbing noise when all of the switching elements of the inverter are turned off. More specifically, since the inverter carries out regenerative operation while switching of the switching elements is continuously performed at the frequency of 40 kHz, the current flows toward the plus terminal of an electrolytic capacitor C and that of a power supply (not shown), as indicated by the arrow of FIG. 6. This causes a rapid fall in the current waveform, as illustrated in FIG. 5. By the time the overcurrent is canceled, the voltage has decreased in correspondence with the time for which the switching elements have been maintained in off states for overcurrent protection. Therefore, controlling of the switching elements is resumed in accordance with a maximally increased duty. The fall of the output current thus becomes more rapid than the rise, greatly changing the duty. This apparently causes a ripple waveform current of approximately 13 kHz, one third of 40 kHz, thus generating whine.

In the system of Japanese Laid-Open Patent Publication No. 5-137392, when an overcurrent is detected, energy of an output coil is consumed by a load. That is, instead of the regenerative operation, a flywheel operation is carried out as an overcurrent protective operation. In this case, the fall of the current when the switching elements are maintained in an OFF state becomes moderate, suppressing a great change of the duty. Therefore, the output current varies at 40 kHz, thus preventing generation of whine. However, if it is impossible to consume the energy of the output coil due to, for example, a short circuit caused in the output, the peak of the current may become excessively great, thus damaging the switching elements.

SUMMARY OF THE INVENTION

Accordingly, it is an objective of the present invention to provide an overcurrent protective device for switching elements that prevents generation of whine when performing overcurrent protective operation and minimizes the difference between the peak of a current in accordance with the rated load and the peak of a current when a short circuit is caused in an output.

To achieve the foregoing objectives, one aspect of the present invention provides an overcurrent protective device for an inverter device. The inverter device includes a power supply, groups of switching elements, a diode, and a switching frequency increase preventing section. The power supply has a plus terminal and a grounding terminal. One group of switching elements is connected to the plus terminal of the power supply. Another group of switching elements is connected to the grounding terminal of the power supply. One of the groups is defined as a first group, and the other group is defined as a second group. The diode is connected to each of the switching elements in a back-to-back connection manner. The switching frequency increase preventing section prevents an increase of a switching frequency when an overcurrent protective operation is performed. A load is connected to the inverter device. The overcurrent protective device includes a current detecting section and a control section. The current detecting section detects the amount of a current flowing through the switching elements. The control section determines whether the inverter device is held in a first state or a second state in correspondence with an input from the current detecting section. The amount of the current flowing through the switching elements when it is determined that the inverter device is held in the second state is greater than the amount of the current flowing through the switching elements when it is determined that the inverter device is held in the first state. When it is determined that the inverter device is held in the first state, the control section performs a flywheel operation in which drive signals for the first group of the switching elements are maintained in OFF states, and at least one of the switching elements of the second group is maintained in an ON state so that a current circulates through the load and the second group of the switching elements. When it is determined that the inverter device is held in the second state, the control section performs a regenerative operation in which the drive signals for all of the switching elements are maintained in OFF states.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF ILLUSTRATIVE EMBODIMENTS

An inverter device 11 for a vehicle according to an embodiment of the present invention will now be described with reference to FIGS. 1 to 4. The inverter device 11 uses a battery installed in the vehicle as a power supply E and outputs an alternating current of 100V.

Figure 1:
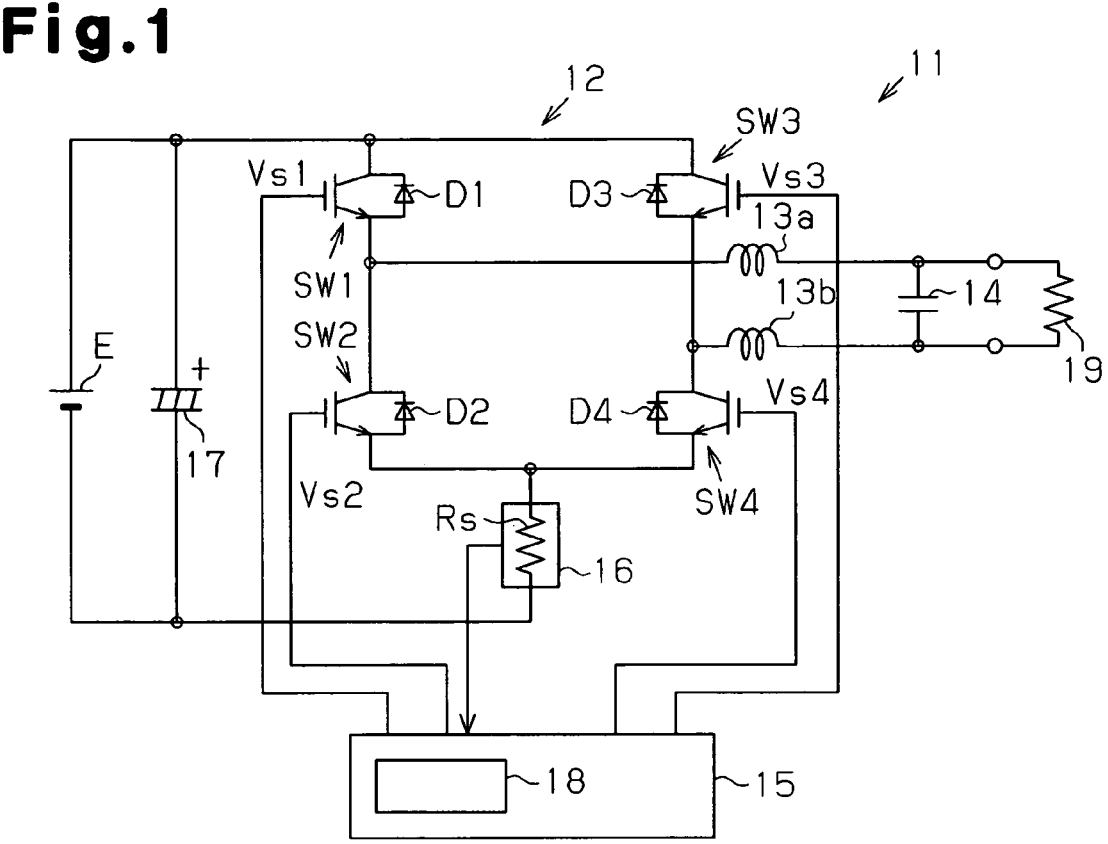
FIG. 1 is a circuit diagram representing an inverter device that includes an overcurrent protective device according to an embodiment of the present invention.

As shown in FIG. 1, the inverter device 11 has an H-bridge circuit 12 including four switching elements, which are first, second, third, and fourth switching elements SW1, SW2, SW3, SW4. In the H-bridge circuit 12, the first and third switching elements SW1, SW3 are connected to the plus terminal of the power supply E. The second and fourth switching elements SW2, SW4 are connected to the grounding terminal of the power supply E. Diodes D1, D2, D3, D4 are connected to the switching elements SW1, SW2, SW3, SW4 respectively, in a back-to-back connection.

Basic operation of the H-bridge circuit 12 (the switching elements SW1 to SW4) will hereafter be described. In the following, a single cycle of the commercial alternating current, which is 50 to 60 Hz, will be divided into a first half cycle and a second half cycle. In the first half cycle (the normal mode (A), which will be explained later), the switching element SW1 is maintained in an OFF state and the switching element SW2 is maintained in an ON state. Meanwhile, the switching elements SW3, SW4 are repeatedly and alternately turned on and off at 40 kHz (a control frequency). In the second half cycle (the normal mode (B), which will be explained later), the switching element SW3 is maintained in an OFF state and the switching element SW4 is maintained in an ON state. The switching elements SW1, SW2 are repeatedly and alternately turned on and off at 40 kHz (the control frequency). The first and second half cycles are alternately repeated. The on-duty of the switching element SW3 in the first half cycle and the on-duty of the switching element SW1 in the second half cycle are adjusted in correspondence with a target voltage. In this manner, a sinusoidal alternating voltage is provided to an output terminal of the inverter device 11. As each of the switching elements SW1 to SW4, an IGBT is employed. Reactors (output coils) 13a, 13b and a capacitor 14, which form a filter, are connected to an output portion of the inverter device 11.

A controller 15 (a control section), or control means, generates drive signals Vs1, Vs2, Vs3, Vs4. Each of the drive signals Vs1 to Vs4 is sent to the control terminal (in the illustrated embodiment, the gate of the IGBT) of the corresponding one of the switching elements SW1 to SW4. In a normal mode, the controller 15 generates the drive signals Vs1, Vs2, Vs3, Vs4 in such a manner as to repeatedly alternate the first half cycle and the second half cycle at a predetermined cycle. The drive signals Vs1 to Vs4 are sent to the corresponding switching elements SW1 to SW4.

A current detecting circuit 16 (a current detecting section), or current detecting means, is provided between a connection point between the emitter of the switching element SW2 and the emitter of the switching element SW4 and a grounding point. The current detecting circuit 16 detects the amount of current flowing through the switching elements SW1 to SW4. Specifically, the current detecting circuit 16 outputs a detection signal in correspondence with the amount of current flowing through a shunt resistor Rs. An electrolytic capacitor 17 is provided in parallel with the power supply E.

The controller 15 includes a non-illustrated microcomputer. The controller 15 operates in accordance with a current limiting mode, which is also a mode for actuating the switching elements SW1, SW2, SW3, SW4, in addition to the normal mode. In the normal mode, the basic operation is performed. In the current limiting mode, a current having a predetermined level is output so that the output is not completely suspended, while preventing damages to the switching elements SW1 to SW4 due to an overcurrent (an excessive current).

As the current limiting mode, a first overcurrent level mode and a second overcurrent level mode are provided. In the first overcurrent level mode, the controller 15 turns off the drive signals to the switching elements SW1, SW3, which are connected to the plus terminal of the power supply E. In the second overcurrent level mode, the controller 15 also turns off the drive signals to the switching elements SW2, SW4. That is, in the second overcurrent level mode, the drive signals to the switching elements SW1 to SW4 are all turned off.

Table 1 shows the states of the drive signals to the switching elements SW1 to SW4 in the normal mode and the first and second overcurrent level modes. In each of the modes, the controller 15 outputs the drive signals to the switching elements SW1 to SW4 in such a manner as to repeat the upper part (A) of Table 1, or the first half cycle, and the lower part (B) of the table, or the second half cycle. In the table, "Alternate ON/OFF" and "ON/OFF" refer to "repeatedly and alternately turned on and off at 40 kHz" and "repeatedly turned on and off at 40 kHz", respectively.

TABLE 1

|  |  | SW1 | SW2 | SW3 | SW4 |
|---|---|---|---|---|---|
| Normal Mode | A | OFF | ON | | Alternate ON/OFF |
|  | B | Alternate ON/OFF | | OFF | ON |
| 1st Overcurrent Level Mode | A | OFF | ON | OFF | ON/OFF |
|  | B | OFF | ON/OFF | OFF | ON |
| 2nd Overcurrent Level Mode | A | OFF | OFF | OFF | OFF |
|  | B | OFF | OFF | OFF | OFF |

The controller 15 receives the detection signal from the current detecting circuit 16 and thus determines whether an overcurrent is flowing in the corresponding, second and fourth switching elements SW2, SW4. As references for determining the level of the overcurrent, a first level, or a first state, and a second level, or a second state, are defined. The second level is higher than the first level. The first level corresponds to a rated output level of the inverter device 11. The second level corresponds to a level at which the switching elements SW1 to SW4 are prevented from being damaged by a short circuit occurring in the output terminal.

When the overcurrent of the first level is detected, the controller 15 controls operation of the switching elements SW1 to SW4 in accordance with the first overcurrent level mode (performs flywheel operation). When the overcurrent of the second level is detected, the controller 15 controls operation of the switching elements SW1 to SW4 in accordance with the second overcurrent level mode (performs regenerative operation).

The controller 15 includes switching frequency increase preventing means 18, or a switching frequency increase preventing section, that prevents the switching frequency from increasing while overcurrent protection is performed. The switching frequency increase preventing means 18 is configured essentially identical to that of the overcurrent protective device described in Japanese Laid-Open Patent Publication No. 2002-354659. For example, the switching frequency increase preventing means 18 includes a latch circuit, a gate circuit, and release means or a release section. The latch circuit latches an overcurrent detection signal. When the latch circuit is held in a latching state, the gate circuit blocks a drive signal to a switching element. When the latch circuit is in a non-latching state, the gate circuit permits sending of the drive signal. The release means releases the latch circuit from the latching state by means of a signal synchronized with the drive signal.

Operation of the above-described device will now be explained.

As long as an overcurrent is not indicated by the detection signal from the current detecting circuit 16, the controller 15 operates in accordance with the normal mode. Specifically, the controller 15 outputs the drive signals Vs1 to Vs4, in such a manner as to repeatedly alternate the state (A) and the state (B) of the normal mode of Table 1 at the predetermined cycle corresponding to the frequency of the commercial alternating current (50 to 60 Hz). The sinusoidal alternating voltage is thus output from the output portion.

Overcurrent protective operation of the controller 15 will hereafter be described.

Figure 2:
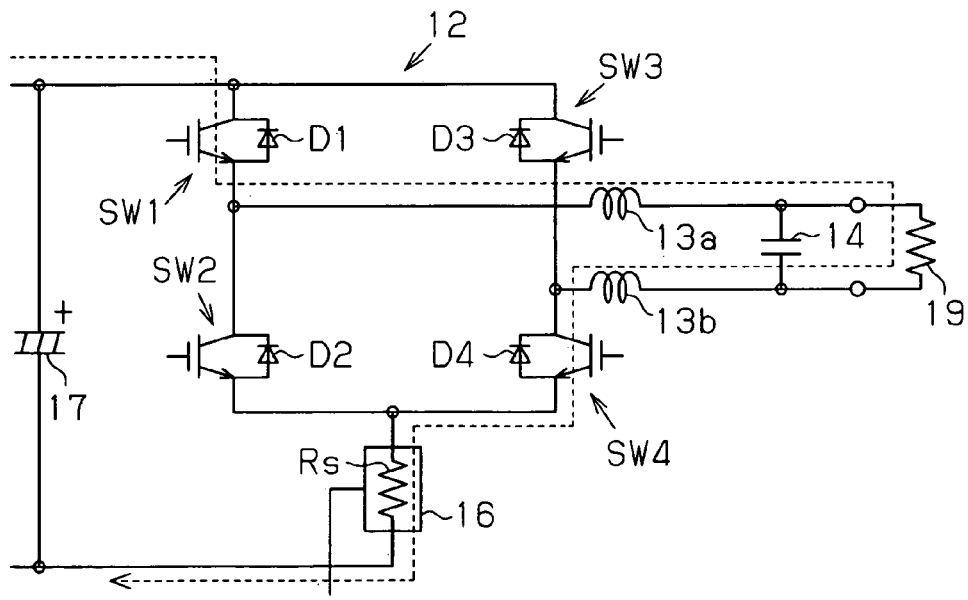
FIG. 2 is a circuit diagram representing the flow of a current through the inverter device of FIG. 1 in a normal state.
Figure 3A:
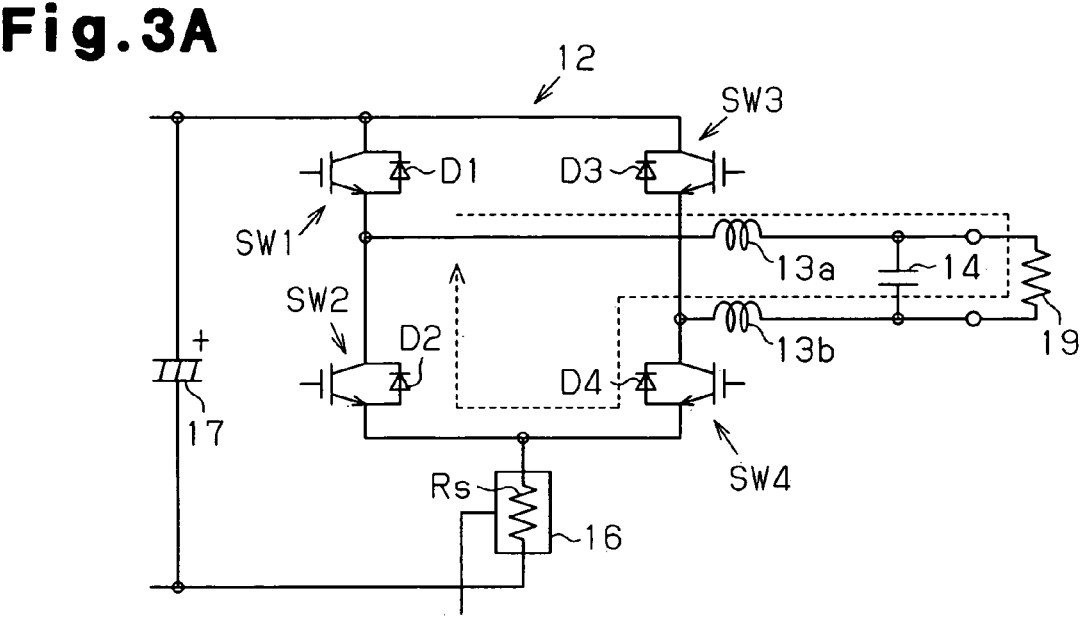
FIG. 3A is a circuit diagram representing the flow of a current through the inverter device of FIG. 1 in a flywheel operation.
Figure 3B:
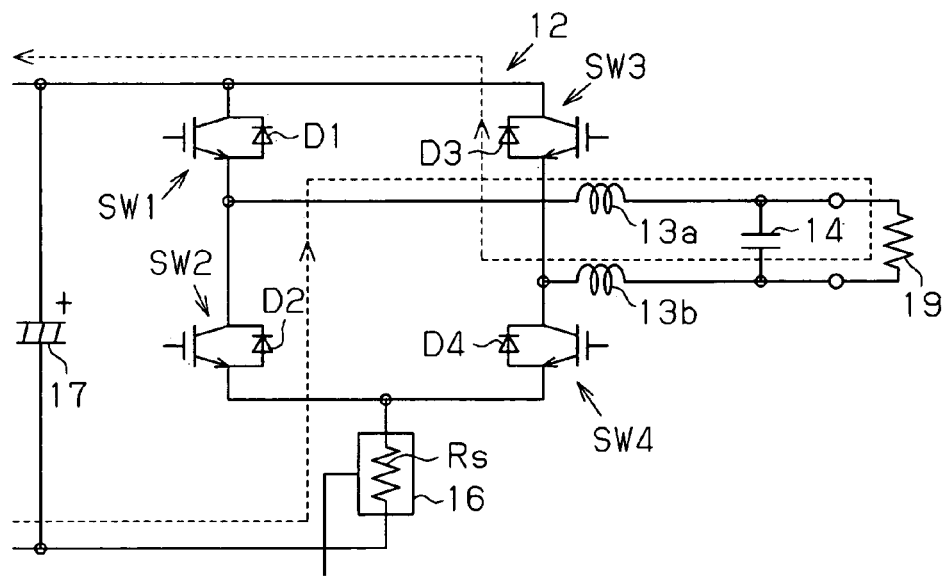
FIG. 3B is a circuit diagram representing the flow of a current through the inverter device of FIG. 1 in a regenerative operation.
Figure 4:
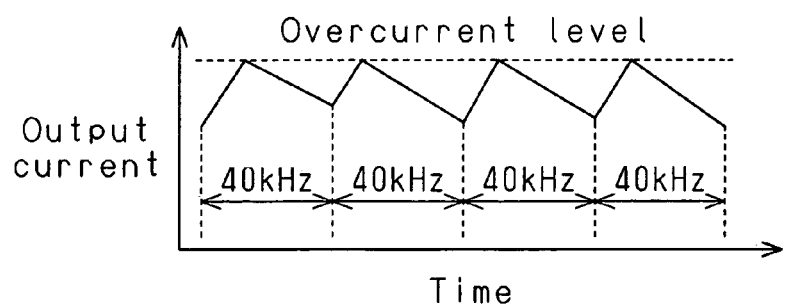
FIG. 4 is a graph representing a current waveform through the inverter device of FIG. 1 in the flywheel operation.

If the switching element SW1 is held in an ON state in the normal mode (B), a current flows through a load 19, as indicated by the broken lines of FIG. 2. If, in this state, an overcurrent of the first level is caused in the switching element SW4 and detected through a detection signal of the current detecting circuit 16, the controller 15 performs the current limiting mode and the overcurrent protective operation corresponding to the first level. In other words, the controller 15 turns off the drive signals to the switching elements SW1, SW3 located in an upper arm of the H-bridge circuit 12. Since the switching element SW3 is originally maintained in an OFF state in this case, the switching element SW1 is turned off.

Accordingly, as indicated by the part corresponding to the first overcurrent level mode (B) of Table 1, the switching elements SW1, SW3 are each held in an OFF state and the fourth switching element SW4 is held in an ON state. Further, as indicated by the broken lines of FIG. 3A, a current flows in the reactor 13a, the load 19, the reactor 13b, the fourth switching element SW4, and the second switching element SW2 (a diode D2) in this order, returning to the reactor 13a. The controller 15 thus performs the flywheel operation so that the energy of each reactor 13a, 13b is consumed by the load 19. In other words, the energy is consumed by circulating the current between the load 19 and the switching elements SW2, SW4, which are not maintained in the OFF states.

When the first switching element SW1 is switched from the ON state to the OFF state, the amount of the current flowing through the current detecting circuit 16 becomes smaller than the first level. However, instead of immediately turning on the first switching element SW1, the switching frequency increase preventing means 18 operates to turn on the first and third switching elements SW1, SW3 at a subsequent output timing of the drive signal. The controller 15 thus operates in accordance with the normal mode (B), and the current flows through the load 19 as indicated by the broken lines of FIG. 2. However, in a transitional operation stage of the controller 15 from the second half cycle (the state (B)) to the first half cycle (the state (A)), the controller 15 operates in accordance with the normal mode (A). Therefore, the current is supplied from the power supply E to the load 19 along a path passing through the third switching element SW3, the reactor 13b, the load 19, the reactor 13a, the second switching element SW2, and the current detecting circuit 16 in this order.

In the flywheel operation, decreasing of the current level when the switching elements are held in the OFF states becomes slow. The current thus changes as time elapses in accordance with the waveform of FIG. 4. That is, compared to the waveform of FIG. 5, the waveform of FIG. 4 includes gradual falls more moderate than rises. Further, there is not great change of the duty at 40 kHz. This suppresses whine generated by the coil.

If an overcurrent of the second level flows in the switching element SW4 in the normal mode (B) when the switching element SW1 is held in the ON state and a current flows through the load 19 as indicated by the broken lines of FIG. 2, a detection signal generated by the current detecting circuit 16 indicates occurrence of the overcurrent. In response to such detection, the controller 15 performs the current limiting mode and the overcurrent protective operation corresponding to the second level. In other words, the controller 15 turns off the drive signals to the switching elements SW1, SW3, which are located in the upper arm of the H-bridge circuit 12. Further, the controller 15 also turns off the drive signals to the switching elements SW2, SW4, which are located in a lower arm of the H-bridge circuit 12.

Figure 5:
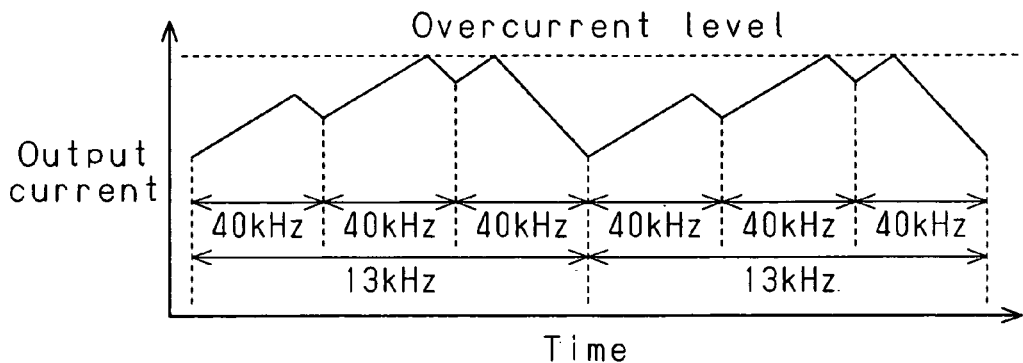
FIG. 5 is a graph representing a current waveform through a prior-art inverter device in a regenerative operation.
Figure 6:
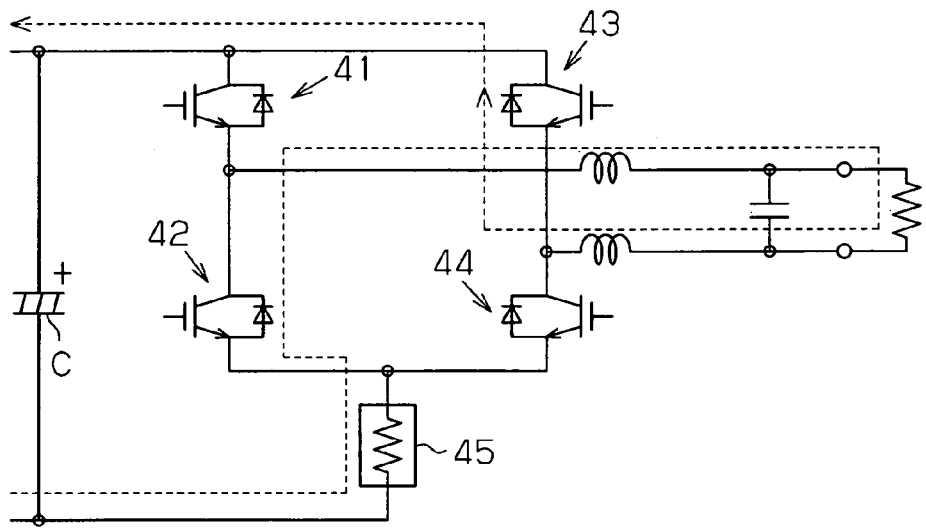
FIG. 6 is a circuit diagram representing a portion of the prior-art inverter device.
Figure 7:
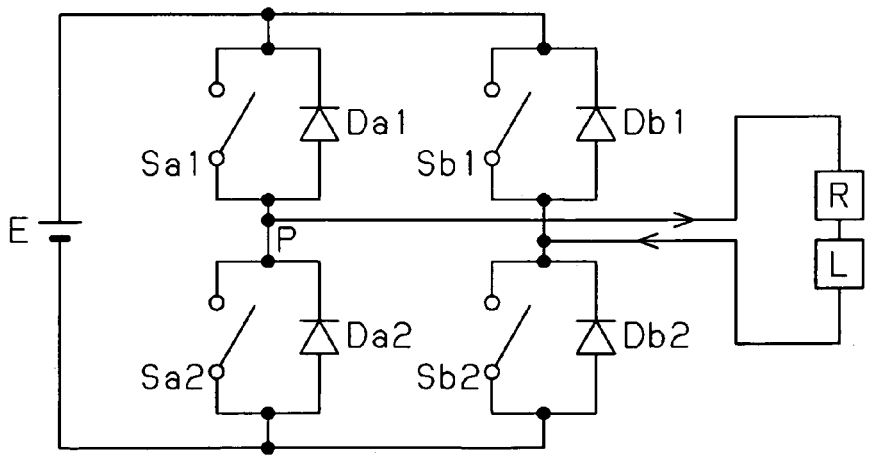
FIG. 7 is a diagram for explaining overcurrent protective operation in another prior-art inverter device.

Accordingly, as indicated by the part of Table 1 corresponding to the second overcurrent level mode (B), the switching elements SW1 to SW4 are all held in the OFF states. The controller 15 thus performs the regenerative operation. That is, the energy accumulated in the reactor 13*a* is returned to the electrolytic capacitor 17 or the power supply E through the path indicated by the broken lines of FIG. 3B. In this state, the diodes D1, D2, D3, D4, which are connected to the corresponding switching elements SW1, SW2, SW3, SW4 in a back-to-back connection, become conductive. If the regenerative operation is performed when the level of the overcurrent corresponds to the first level, the rise of the current when the switching elements are turned on becomes moderate, as compared to the fall of the current when the switching elements are turned off. Therefore, even if switching is carried out at 40 kHz, the resulting waveform includes a ripple current that changes greatly at a cycle corresponding to one third of 40 kHz, as illustrated in FIG. 5. This causes generation of disturbing noise, such as whine.

However, in the illustrated embodiment, the overcurrent protective operation for performing the regenerative operation is carried out only when the level of the overcurrent detected by the current detecting circuit 16 corresponds to the second level. Since the overcurrent of the second level is greater than the overcurrent of the first level, the target voltage corresponding to the second level overcurrent is higher than that of the first level overcurrent. Thus, the rise of the current when the switching elements are turned on becomes rapid compared to the case in which the overcurrent protective operation is performed for the overcurrent of the first level. Therefore, the rise of the current when the switching elements are turned on becomes rapid compared to the fall of the current when the switching elements are turned off. The waveform of the current thus does not become the one shown in FIG. 5, in which the ripple current greatly change at the cycle of 13 kHz, but changes at 40 kHz like the current waveform shown in FIG. 4. This prevents generation of disturbing noise in an audible range not greater than 20 kHz. Although the overcurrent protective operation has been explained in accordance with the state (B) of each of the modes, the operation is carried out in the same manner in the state (A). The explanation for the state (A) will thus be omitted.

The illustrated embodiment has the following advantages.

(1) The overcurrent protective device detects the current flowing though the switching elements SW1 to SW4. If an overcurrent of the first predetermined level is detected, the drive signals to the switching elements SW1, SW3, which are connected to the plus terminal of the power supply E, are turned off. The flywheel operation is then performed. If an overcurrent of the second level, which is higher than the first level, is detected, the drive signals to the other switching elements SW2, SW4 are turned off. This prevents generation of disturbing noise in the overcurrent protective operation.

(2) The first level of the overcurrent corresponds to the rated output level of the inverter device 11. The second level corresponds to the level at which the switching elements SW2, SW4 are prevented from being damaged when a short circuit occurs at the output terminal. Therefore, if an overload is connected to the output terminal of the inverter device 11, the flywheel operation is carried out as the overcurrent protective operation. If the short circuit is caused at the output terminal, the regenerative operation is performed as the overcurrent protective operation. In these manners, generation of disturbing noise is suppressed in the overcurrent protective operation. Further, a difference between the peak of a current flowing through the switching elements when a rated load is applied and the peak of a current flowing through the switching elements when the short circuit is caused at the output terminal is canceled. It is thus possible to design the inverter device 11 using rated current switching elements under the rated load.

The illustrated embodiment is not limited to the above-described form but may be modified in the following manners.

In the normal mode (A) of the illustrated embodiment, the switching element SW1 is held in the OFF state and the switching element SW2 is held in the ON state. The switching elements SW3, SW4 are repeatedly and alternately turned on and off. In the normal mode (B), the switching element SW3 is maintained in the OFF state and the switching element SW4 is held in the ON state. The switching elements SW1, SW2 are repeatedly and alternately turned on and off. However, the present invention is not restricted to such controlling.

That is, in the normal mode (A), the switching element SW1 may be maintained in the ON state while the switching element SW2 is held in the OFF state. The switching elements SW3, SW4 repeatedly and alternately are turned on and off. In the normal mode (B), the switching element SW3 may be held in the ON state while the switching element SW4 is held in the OFF state. The switching elements SW1, SW2 are repeatedly and alternately turned on and off. Also in this manner, the sinusoidal alternating voltage can be output. Further, in this case, if the level of a detected overcurrent corresponds to the first level, the switching elements SW2, SW4, which are located in the lower arm, are turned off to carry out the flywheel operation. If the level of the detected overcurrent corresponds to the second level, the switching elements SW1 to SW4 are all turned off to perform the regenerative operation. This also ensures the advantages of the illustrated embodiment.

Alternatively, in the normal mode (A), the switching elements SW2, SW3 may be repeatedly and simultaneously turned on and off. The switching elements SW1, SW4 may each be held in the OFF state. In the normal mode (B), the switching elements SW1, SW4 may be repeatedly and simultaneously turned on and off. The switching elements SW2, SW3 may each be held in the OFF state. Also in this manner, the sinusoidal alternating voltage is output. In this case, if the level of a detected overcurrent corresponds to the first level, the switching elements SW1, SW3 of the upper arm are turned off. Meanwhile, to circulate the current between the load 19 and the other switching elements SW2, SW4, at least the switching element SW2 is turned on in the state (A) and at least the switching element SW4 is turned on in the state (B). Alternatively, if the level of the detected overcurrent corresponds to the first level, the switching elements SW2, SW4 of the lower arm are turned off. Meanwhile, to circulate the current between the load 19 and the other switching elements SW1, SW3, at least the switching element SW3 is turned on in the state (A) and at least the switching element SW1 is turned on in the state (B). If the level of the detected overcurrent corresponds to the second level, the switching elements SW1 to SW4 are all turned off to perform the regenerative operation. Also in this manner, the advantages of the illustrated embodiment are obtained.

In the first overcurrent level mode (A) of the illustrated embodiment, the switching element SW4 is repeatedly turned on and off. In the first overcurrent level mode (B), the switching element SW2 is repeatedly turned on and off. However, the switching element SW4 or SW2 may be maintained in the ON state or the OFF state. That is, at least one of the switching elements of an arm that is not maintained in the OFF state must be turned onto circulate the current in the connected load and the switching element of the arm that is not maintained in the OFF state.

Although the present invention is applied to the inverter that outputs a sinusoidal wave in the illustrated embodiment, the invention may be applied to an inverter that outputs a pseudo-sinusoidal wave (a rectangular wave). In this case, control frequency for outputting the rectangular wave in a normal mode may be set to a value equal to the frequency of output power, which is, for example, 50 to 60 kHz. The control frequency is changed to 40 kHz in an overcurrent level mode and controlling is carried out in the same manner as the illustrated embodiment. This also ensures the advantages of the embodiment.

A first state may be defined as a state in which the level of the detected current corresponds to the rated output level of the inverter device 11 and the fall of the output current becomes more rapid than the rise of the output current when the switching elements SW1 to SW4 are operated in accordance with the regenerative operation. Specifically, if the inclination of the fall of the output current in the regenerative operation is obtained or assumed in advance, or, for example, if the connected load is acknowledged in advance, the inclination is memorized. The memorized value is compared with the rise of the current value when the detected current value corresponds to the rated output level. Through such comparison, it is determined whether the inverter device 11 is in the first state. Also in this case, generation of audible and disturbing noise is prevented by performing the flywheel operation as the overcurrent protective operation. Further, the inverter device 11 falls in the first state only when the flywheel operation is necessary. Thus, such operation is performed in this state. In other words, in a case where the rise of the output current during the regenerative operation is unlikely to generate disturbing noise, the flywheel operation is not performed even if the amount of current flowing though the switching elements SW1 to SW4 correspond to a predetermined value. The predetermined value preferably corresponds to a rated output level of the inverter device 11.

In the overcurrent protective operation, the frequency of the inaudible range in which the switching elements SW1 to SW4 are switched on and off is not limited to 40 kHz.

The electrolytic capacitor 17 may be omitted as long as the distance between the power supply E and the H-bridge circuit 12 is relatively small and the capacity of wiring is sufficiently large.

The switching frequency increase preventing means may be defined by software that is operated by the microcomputer or an actual circuit.

As the switching elements SW1 to SW4, switching elements other than IGBTs, such as MOSFETs, may be employed.

Although the present invention is applied to the inverter device 11 for vehicle, the invention may be applied to a 100V AC inverter using a battery as a power supply. Further, the output voltage of the inverter device 11 is not limited to the level of 100V but may be altered as needed.

The present invention may be applied to a three-phase AC inverter, other than a single-phase inverter.

What is claimed:

1. An overcurrent protective device for an inverter device, the inverter device including:

a power supply having a plus terminal and a grounding terminal;

an H-bridge circuit including a group of switching elements connected to the plus terminal of the power supply and a group of switching elements connected to the grounding terminal of the power supply, one of the groups being defined as a first group, the other a second group;

a diode connected to each of the switching elements in a back-to-back connection manner; and a switching frequency increase preventing section that prevents an increase of a switching frequency when an overcurrent protective operation is performed, a load being connected to the inverter device, the overcurrent protective device comprising:

a current detecting section that detects the amount of a current flowing through the switching elements;

a control section that determines whether the inverter device is held in a first state or a second state in correspondence with an input from the current detecting section, wherein the amount of the current flowing through the switching elements when it is determined that the inverter device is held in the second state is greater than the amount of the current flowing through the switching elements when it is determined that the inverter device is held in the first state, wherein, when it is determined that the inverter device is held in the first state, the control section performs a flywheel operation in which drive signals for the first group of the switching elements are maintained in OFF states, and at least one of the switching elements of the second group is maintained in an ON state so that a current circulates through the load and the second group of the switching elements, and wherein, when it is determined that the inverter device is held in the second state, the control section performs a regenerative operation in which the drive signals for all of the switching elements are maintained in OFF states.

2. The overcurrent protective device according to claim 1, wherein the control section determines that the inverter device is held in the first state if the amount of the current flowing through the switching elements corresponds to a rated output level of the inverter device, and wherein the control section determines that the inverter device is held in the second state if the amount of the current flowing through the switching elements corresponds to a level at which the switching elements are prevented from being damaged when a short circuit occurs in an output.

3. The overcurrent protective device according to claim 1, wherein the control section determines that the inverter device is held in the first state if the amount of the current flowing through the switching elements is a predetermined value and a fall of an output current occurs more rapidly than a rise of the output current when the regenerative operation is performed, and wherein the control section determines that the inverter device is held in the second state if the amount of the current flowing through the switching elements corresponds to a level at which the switching elements are prevented from being damaged when a short circuit occurs in an output.

4. The overcurrent protective device according to claim 1, wherein the power supply is a battery installed in a vehicle.

5. The overcurrent protective device according to claim 1, wherein each of the switching elements is formed by an IGBT.

* * * * *